United States Patent Office 3,773,938
Patented Nov. 20, 1973

3,773,938
1-PHENYL-6-AZACYTOSINES AS
COCCIDIOSTATS
Max W. Miller, Stonington, Conn., assignor to
Pfizer Inc., New York, N.Y.
No Drawing. Original application Feb. 19, 1971, Ser. No. 117,055, now Patent No. 3,715,356. Divided and this application Oct. 11, 1972, Ser. No. 300,561
Int. Cl. A61k 27/00
U.S. Cl. 424—249  2 Claims

ABSTRACT OF THE DISCLOSURE

Substituted 1-phenyl-6-azacytosines are effective in the control and treatment of coccidiosis.

CROSS-REFERENCE TO RELATED APPLICATIONS

This application is a division of application Ser. No. 117,055, filed Feb. 19, 1971, now U.S. Pat. 3,715,356.

BACKGROUND OF THE INVENTION

This invention relates generally to new chemical compounds. It relates further to new compounds which are useful in treating and preventing the poultry disease coccidiosis. More particularly, it is concerned with novel substituted 1-phenyl-6-azacytosines and their effectiveness in the control and treatment of coccidiosis. Coccidiosis, a poultry disease, is caused by several species of protozoan parasites of the genus Eimeria, such as *E. tenella, E. necatrix, E. acervulina, E. maxima, E. hagani. E. tenella* is the causative agent of a severe and often fatal infection of the ceca of chickens which is manifested by extensive hemorrhage, accumulation of blood in the cecum, and passage of blood in the droppings. Essentially, coccidiosis is an intestinal disease which is disseminated by birds picking up the infectious organism in droppings on contaminated litter or ground. Because of damage to the intestinal wall, the host animal is unable to utilize its food and goes off its feed. In untreated cases the disease terminates in either the death of the animal or the survival of unthrifty birds known as "culls."

It has now been discovered that certain substituted 1-phenyl-6-azacytosines possess a high degree of activity against protozoa which cause coccidiosis. It is one object of the present invention to provide such compounds. A further object is the provision of a method which is useful in the treatment or prevention of coccidiosis which comprises the utilization of the herein disclosed novel compound.

SUMMARY OF THE INVENTION

The novel substituted 1-phenyl-6-azacytosines disclosed herein may be represented by the following structural formula:

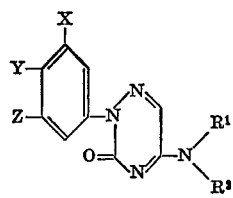

wherein $R^1$ and $R^2$ is each hydrogen, lower alkyl, lower mono or di-alkoxyalkyl;
each of X and Z is hydrogen, chloro, bromo, nitro, trifluoromethyl, cyano, or lower alkyl;

Y is hydrogen, monochlorophenyl sulfonyl, monochlorophenyl carbonyl, monochlorophenyloxy, monochlorophenylthio, or monochlorophenyl amino with the proviso that when Y is other than hydrogen, X and Z are each hydrogen, chloro, bromo, or lower alkyl.

The terms "lower alkyl," and "lower alkoxyalkyl," as used herein, are intended to include alkyl and alkoxyalkyl groups having from 1 to 3 carbon atoms.

The compounds described herein may be administered to the poultry alone but are preferably administered in conjunction with a suitable, inert carrier such as a nutritionally balanced poultry feed. The compounds can also be administered via the drinking water. Although the preferred route of administration is the oral route, it is possible to administer these coccidiostatic compounds via the rectum.

DETAILED DESCRIPTION OF THE INVENTION

The starting compounds in the manufacture of the products of this invention, 2-phenyl-as-triazin-3,5-(2H, 4H)-diones, are prepared by known methods such as are described by Slouka, [Monatsh. Chem. 96: 134–137, (1965)] and by my copending application, Ser. No. 78,917 filed Oct. 7, 1970, which comprises decarboxylation of the corresponding 6-carboxy derivatives. The requisite 6-carboxy acid derivatives are obtained by acid hydrolysis of the corresponding cyano compounds which are, in turn, prepared according to the procedure of Slouka, Monatsh. Chem. 94, 258–262 (1963). This method comprises reaction of the appropriate phenyl diazonium salt with cyanoacetylurethan to provide the corresponding phenylhydrazono - cyanoacetylurethan which, under the influence of alkali or sodium acetate-acetic acid or ammonium acetate-acetic acid, produces the 6-cyano compound which is hydrolyzed to the carboxy acid under acid or alkaline conditions.

The active compounds of this invention, substituted 1-phenyl-6-azacytosines, are prepared by treating the above phenylazauracil with appropriate chlorinating agents such as phosphorus pentachloride and phosphorus oxychloride and then treating the resulting 1-phenyl-5-chloro-6-azacytosine with ammonia, ammonium hydroxide, or amines.

The molar proportion of reactants in the chlorination is not critical but can range from equimolar proportions up to a large excess of the chlorinating agents. In general temperatures ranging from about 90° C. to about 107° C. (reflux) are favored. The reaction is generally conducted over a period of from about 2 to about 24 hours.

Upon completion of the chlorination reaction, the excess reagent is removed at reduced pressure and excess ammonia, ammonium hydroxide, or amine is added. When ammonium hydroxide or a low boiling amine such as methyl amine is employed, the reaction may be carried out at room temperature or even a somewhat lower temperature, with one hour usually being sufficient time for the completion of the reaction. When more complex amines are employed, the reaction may be carried out at reflux temperatures in a suitable solvent system such as benzene and the time may be increased to about 2 hours. The product is decolorized, if necessary, and recrystallized.

The 2-phenyl-as-triazine-3,5(2H,4H)diones described herein, which contain activating groups such as the 2-(2,4-dinitrophenyl) compounds, are also prepared by direct phenylation of the parent compound, as-triazine-3,5(2H, 4H)dione, known trivially as 6-azauracil. The general procedure comprises treatment of as-triazine-3,5(2H,4H)-dione in a suitable solvent system in the presence of an acid acceptor with the appropriate halobenzene such as 2,4-dinitrofluorobenzene. Suitable solvents are water, ethylene glycol, N,N-dimethylformamide, dimethylsulfoxide and lower alkanols.

The molar proportion of reactants is not critical but can range from equimolar proportions up to a large excess of either reactant. In general, molar proportions of as-triazine-3,5(2H,4H)dione to halobenzene compound of from about 1:1 to about 1:2 are satisfactory.

The reaction temperature is not critical. In general, temperatures ranging form ambient temperature up to about 60° C. are favored. Higher temperatures or lower temperatures can, of course, be used but appear to offer no advantages. The reaction is generally conducted over a period of from about 2 to about 8 hours. Upon completion of the reaction, the reaction mixture is decolorized, if necessary; acidified to a pH of from about 3 to about 5; and cooled to precipitate the product. The product thus obtained is purified by methods known to those skilled in the art as, for example, by recrystallization from appropriate solvents, by chromatography on a suitable adsorbent, or by a combination of these methods.

The present agents may be orally administered to poultry in a suitable carrier therefor. It is generally convenient and, therefore, preferred to add the agents to the poultry feed so that a therapeutic dosage of the agent is ingested with the daily poultry ration. The agent may be added directly to the feed, as such, or in the form of a premix or concentrate. A premix or concentrate of therapeutic agent in a carrier is commonly employed for the inclusion of the agent in the feed. Suitable carriers are liquid or solid, as desired, such as water, various meals; for example, soybean oil meal, linseed oil meal, corncob meal, and mineral mixes such as are commonly employed in poultry feeds. A particularly effective carrier is the poultry feed itself; that is, a small portion of poultry feed. The carrier facilitates uniform distribution of the active materials in the finished feed with which the premix is blended. This is important because only small portions of the present potent agents are required. It is important that the compound be thoroughly blended into the premix and, subsequently, the feed. In this respect, the agent may be dispersed or dissolved in a suitable oily vehicle such as soybean oil, corn oil, cottonseed oil, and the like, or in a volatile organic solvent and then blended with the carrier. It will be appreciated that the proportions of active material in the concentrate are capable of wide variation since the amount of agent in the finished feed may be adjusted by blending the appropriate proportion of premix with the feed to obtain a desired level of therapeutic agent.

High potency concentrates may be blended by the feed manufacture with proteinaceous carriers such as soybean oil meal and other meals, as described above, to produce concentrated supplements which are suitable for direct feeding to poultry. In such instances, the poultry is permitted to consume the usual diet. Alternatively, such concentrated supplements may be added directly to the poultry feed to produce a nutritionally-balanced, finished feed containing a therapeutically-effective level of one or more of the compounds of this invention. The mixtures are thoroughly blended by standard procedures, such as in a twin shell blender, to ensure homogeneity. The finished poultry feed should contain roughly between 50 percent and 80 percent of grains, between 0 percent and 10 percent animal protein, between 5 percent and 30 percent vegetable protein, between 2 percent and 4 percent minerals, together with supplemental vitaminaceous sources.

It will, of course, be obvious to those skilled in the art that the use levels of the compounds described herein will vary under different circumstances. Continuous low-level medication, during the growing period, that is during the first 8 to 12 weeks for chickens, is an effective prophylactic measure. In the treatment of established infections, higher levels may be necessary to overcome the infection.

The present compounds may be employed at substantially low levels in feeds for the prevention or treatment of coccidiosis. Generally, the feed compositions of the present invention comprise a minor amount of the 1-phenyl-as-triazine compounds of this invention and a major amount of a nutritionally-balanced feed, as described above. Feed compositions containing as little as 0.008–0.0125 percent of the present agent are found to effectively combat coccidiosis. Large amounts of the agent, up to 0.0250 percent and larger, may also be employed. Of course, concentrations of less than 0.008 percent provide some control of the infections. The concentration range favored in feed compositions is from about 0.0008 percent to about 0.0016 percent of the ration. When administered by incorporation into the drinking water, preferably as an alkali metal or alkaline earth metal salt, the herein described compounds are used at levels one-half the dosage given above for feeds.

The present feed compositions and supplements may also contain other effective therapeutic agents such as antibiotics to promote growth and general health of the poultry as well as sulfa compounds which may increase the effectiveness of the present coccidiostats.

EXAMPLE I

In a three-neck 200 ml. flask 5.1 g. of 2-(3,5-dichlorophenyl)-as-triazin-3,5-(2H,4H)-dione was mixed with 4.6 g. of phosphorus pentachloride and 25 ml. of phosphorus oxychloride. The mixture was heated to reflux temperature with stirring for 6 hours and then volatiles were removed at aspirator pressure. 80 ml. of cold, concentrated ammonium hydroxide were added, the mixture was stirred, and the solid remaining was filtered off. The filtrate was dried and recrystallized from ethyl alcohol to yield 2.6 g. of crystalline 2-(3,5-dichlorophenyl)-2,3,4,5-tetrahydro-5-imino-as-triazin-3-one with a melting point of 254–256° C. and a molecular weight of 257.08 as determined by mass spectral analysis.

*Analysis.*—Calc'd for $C_9H_6ON_4Cl_2$ (percent): C, 39.30; H, 2.93; N, 20.37. Found (percent): C, 39.70; H, 2.37; N, 20.57.

EXAMPLE II 9.0 g. of 2 - (3,5-dichlorophenyl)-as-triazin-3,5-(2H,4H)-dione, after chlorination as in Example I, were added to 100 ml. of cold 40% aqueous methylamine, the mixture was stirred for 1 hour, and was filtered. The filtrate was dried and recrystallized from dimethylformamide. 2.4 g. of 2-(3,5-dichlorophenyl)-2,3,4,5-tetrahydro-5-methylimino-as-triazin-3-one were obtained with a melting point of 340–342° C. and a molecular weight of 271.10 as determined by mass spectral analysis.

*Analysis.*—Calc'd for $C_{10}H_8ON_4Cl_2$ (percent): C, 44.30; H, 2.97; N, 20.67. Found (percent): C, 43.87; H, 3.01; N, 20.65.

EXAMPLE III

In a 100-ml. flask 5.2 g. of 2-(3,5-dichlorophenyl)-as-triazin-3,5(2H,4H)-dione was added to 4.6 g. of phosphorus pentachloride and 25 ml. of phosphorus oxychloride. The mixture was heated to reflux temperature for 2 hours with stirring. The resultant liquid was concentrated to a solid on the aspirator, slurried twice in benzene and finally concentrated to a solid again. This solid was dissolved in 50 ml. of benzene and was mixed with 5.3 g. of amino acetaldehyde diethylacetal and 30 ml. of benzene. The mixture was heated to reflux temperature for 2 hours and then concentrated to a gum in vacuo. The gum was triturated with isopropyl ether, filtered, and the filtrate recrystallized with methanol/water. 2.7 g. of a crystalline product, 2 - (3,5-dichlorophenyl)-5-[2,2-(diethoxy)-ethylamino]-as-triazin-3(2H)-one with a melting point of 163–165° C., resulted. The molecular weight was found to be 373.23.

*Analysis.*—Calc'd for $C_{15}H_{18}O_3N_4Cl_2$ (percent): C, 48.26; H, 4.86; N, 15.01. Found (percent): C, 48.13; H, 4.83; N, 15.23.

EXAMPLE IV

The following additional compounds can also be prepared by the foregoing procedures:

| X | Y | Z | $R_1$ | $R_2$ |
|---|---|---|---|---|
| H | H | H | H | H |
| H | H | H | $C_3H_7$ | H |
| H | H | H | $CH_3$ | $CH_3$ |
| H | H | H | $C_3H_7$ | $C_3H_7$ |
| H | H | H | $CH_3$ | $CH_2-CH(OCH_3)(OCH_3)$ |
| Cl | H | H | Cl | H | H |
| Cl | H | H | Cl | $CH_2O$ | H |
| Br | H | H | Br | H | H |
| $C_3H_7$ | H | H | $CH_3$ | H | H |
| $CH_3$ | H | H | $CH_3$ | H | $CH_3$ |
| $NO_2$ | H | H | H | $CH_3$ | H |
| H | H | H | $CF_3$ | $CH_3$ | H |
| CN | H | H | H | H | H |
| H | H | Monochlorophenyl sulfonyl | H | H | H |
| $CH_3$ | H | Monochlorophenyl carbonyl | $CH_3$ | H | $CH_3$ |
| Cl | H | Monochlorophenloxy | Cl | H | $CH_2OCH_3$ |
| H | H | Monochlorophenylthio | H | H | H |
| H | H | Monochlorophenylamino | H | H | H |

EXAMPLE V

In the screening program to determine the effectiveness of the herein disclosed compounds as coccidiostats, *Eimeria tenella* is used as the test organism, since said organism is probably the most widely occurring species.

Groups of three to five nine-day old Barred Rock Cross strain cockerels are fed a basal ration into which the test compound is incorporated at various concentrations. The basal ration, a commercial chick starter (Purina Commercial Chick Starter, available from the Ralston Purina Co., St. Louis, Missouri), having the following composition, is presented ad libitum to the chicks twenty-four hours before infection and continuously thereafter throughout the course of the tests.

Basal ration composition

| | Percent |
|---|---|
| Crude protein not less than | 18.0 |
| Crude fat not less than | 3.0 |
| Crude fiber not more than | 6.0 |
| Added minerals not more than | 3.5 | supplied by the following ingredients:

Meat and bone meal, fish meal, soybean meal, ground barley, ground oats, ground yellow corn, dehydrated alfalfa meal, wheat middlings, vitamin $B_{12}$ supplement, ethoxyquin (a preservative), animal fat preserved with BHA *, choline chloride, niacin, vitamin A supplement, riboflavin supplement, calcium pantothenate, D activated animal sterol, vitamin E supplement, menadione sodium bisulfite (source of vitamin K activity) **, calcium carbonate, low fluorine rock phosphate, iodized salt, manganese sulfate, manganous oxide, copper sulfate, zinc oxide.

Twenty-four hours after initiation of the medication, the chicks are inoculated orally with 200,000 sporulated cocysts (*Eimeria tenella*) and the average weight per bird per group determined. In addition, a group of 6–10 chicks is fed the basal ration which contains none of the test compound (infected, untreated controls). A further group of 6–10 chicks serves as uninfected, untreated controls. The chicks are examined on the fifth and sixth day post-infection for signs of hemorrhage. On the seventh day post-infection, the average body weight per bird per group is determined, the birds mecropsied, the cecum examined macroscopically, and a pathology index (average degree of infection [A.D.I.]) determined. Chicks which die prior to the fifth day post-infection are considered as toxic deaths. Those which die five days post-infection or later are considered as deaths due to disease. The efficacy of the test compound is judged by the prevention or mortality and by comparison of the pathologic index with that of the unmedicated infected controls. The degree of pathologic involvement at necropsy is expressed as the average degree based on the following scheme: 0=no cecal lesions; 1=slight lesion; 2=moderate lesions; 3=severe lesions; 4=death.

The concentration of test compound in the feed which will produce normal weight gains relative to the uninfected, untreated controls and normal pathology relative to the infected, untreated controls, referred to as the minimum effective concentration (MEC), is thus found to be 0.0004 percent.

The following test results are obtained by the application of the aforementioned testing procedures:

TABLE I.—ANTICOCCIDIAL ACTIVITY OF 2-(3,5-DICHLOROPHENYL)-2,3,4,5-TETRAHYDRO-5-IMINO-AS-TRIAZIN-3-ONE IN *E. TENELLA* INFECTED CHICKS

| Treatment | Dose (p.p.m. in feed) | Weight gain (percent) | A.D.I. |
|---|---|---|---|
| Infected, treated | 7.5 | 103 | 0.4 |
| | 3.8 | 97 | 1.0 |
| | 1.9 | 63 | 2.8 |
| Infected, untreated | | 63 | 3.7 |
| Noninfected, untreated | | | |

TABLE II.—ANTICOCCIDIAL ACTIVITY OF 2-(3,5-DICHLOROPHENYL)-2,3,4,5-TETRAHYDRO-5-METHYLIMINO-AS TRIAZIN-3-ONE IN *E. TENELLA* INFECTED CHICKS

| Test No. | Treatment | Dose (p.p.m. in feed) | Weight gain (percent) | A.D.I. |
|---|---|---|---|---|
| 1 | Infected, treated | 30 | 99 | 0.0 |
| | | 15 | 91 | 0.4 |
| | | 7.5 | 56 | 3.0 |
| | | 3.8 | 76 | 2.4 |
| | Infected, untreated | | 12 | 3.3 |
| | Noninfected, untreated | | | |
| 2 | Infected, treated | 60 | 112 | 0.0 |
| | | 25 | 96 | 0.0 |
| | | 15 | 86 | 1.4 |
| | | 3.8 | 31 | 3.4 |
| | Infected, untreated | | 2 | 3.6 |
| | Noninfected, untreated | | | |
| 3 | Infected, treated | 60 | 123 | 0.2 |
| | | 30 | 119 | 0.2 |
| | | 15 | 111 | 0.4 |
| | Infected, untreated | | 23 | 1.9 |
| | Noninfected, untreated | | | |

TABLE III.—ANTICOCCIDIAL ACTIVITY OF 2-(3,5-DICHLOROPHENYL)-5-[2,2(DIETHOXY) ETHYLAMINO]-AS-TRIAZIN-3(2H)-ONE IN *E. TENELLA* INFECTED CHICKS

| Test No. | Treatment | Dose (p.p.m. in feed) | Weight gain (percent) | A.D.I. |
|---|---|---|---|---|
| 1 | Infected, treated | 60 | 65 | 2.0 |
| | | 15 | 0 | 3.0 |
| | | 3.8 | 31 | 3.6 |
| | Infected, untreated | | 44 | 3.2 |
| | Noninfected, untreated | | | |
| 2 | Infected, treated | 1.2 | 109 | 0.4 |
| | Infected, untreated | | 12 | 3.3 |
| | Noninfected, untreated | | | |

\* BHA = butylated hydroxyanisole.
\*\* Menadione sodium bisulfite = 2-methyl-1,4-naphthaquinone sodium bisulfite.

What is claimed is:
1. A process for controlling coccidiosis in poultry which comprises administering to the poultry a coccidiostatic amount of a compound of

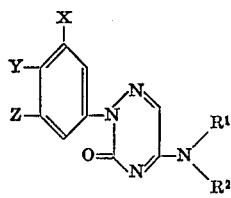

wherein $R^1$ and $R^2$ are each hydrogen, lower alkyl, mono or dilower alkoxyalkyl;

each of X and Z is hydrogen, chloro, bromo, nitro, trifluoromethyl, or lower alkyl;

Y is hydrogen, monochlorophenyl sulfonyl, monochlorophenyl carbonyl, monochlorophenyloxy, monochlorophenylthio, or monochlorophenyl amino with the proviso that when Y is other than hydrogen, X and Z are each hydrogen, chloro, bromo, or lower alkyl.

2. A process according to claim 1 wherein said administering is performed with said compound added to a nutritionally balanced poultry feed.

References Cited
UNITED STATES PATENTS 3,560,496   2/1971   Howes et al. _____ 424—249
3,655,891   4/1972   Howes et al. _____ 424—249

SAM ROSEN, Primary Examiner